Figure 1:
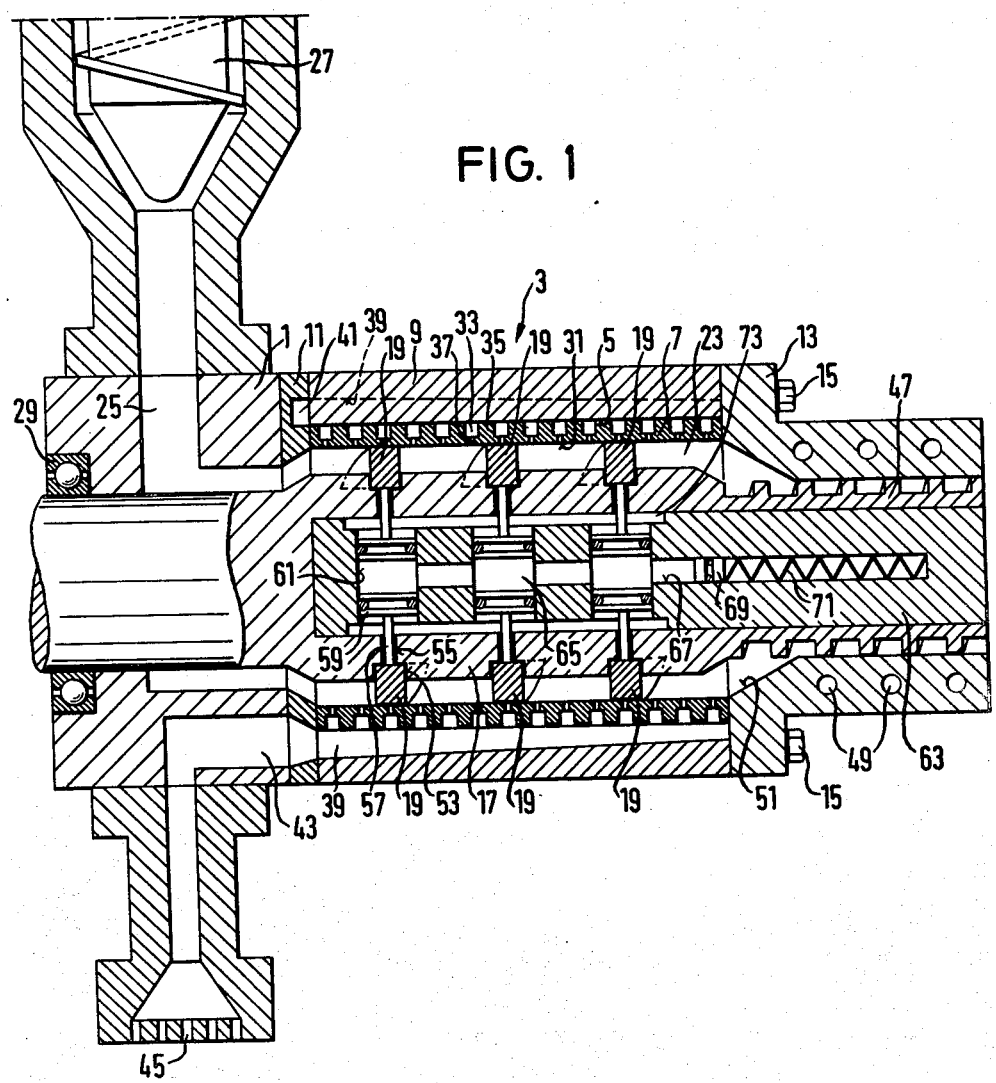

United States Patent [19]

Gail et al.

[11] Patent Number: 4,470,904
[45] Date of Patent: Sep. 11, 1984

[54] MECHANISM FOR SEPARATING MATERIALS OF VARYING CONSISTENCY

[75] Inventors: Josef Gail, Klausenweg 4, D-8890 Aichach; Roderich Ettlinger, Augsburg, both of Fed. Rep. of Germany

[73] Assignee: Josef Gail, Aichach, Fed. Rep. of Germany

[21] Appl. No.: 436,923

[22] Filed: Oct. 26, 1982

[30] Foreign Application Priority Data

Oct. 28, 1981 [DE] Fed. Rep. of Germany ....... 3142806
Nov. 19, 1981 [DE] Fed. Rep. of Germany ....... 3145906
Oct. 21, 1982 [DE] Fed. Rep. of Germany ....... 3239030

[51] Int. Cl.³ ............................................. B01N 29/36
[52] U.S. Cl. ..................... 210/103; 210/149; 210/184; 210/415
[58] Field of Search ....... 210/413, 414, 415, DIG. 15, 210/184, 103, 149

[56] References Cited

U.S. PATENT DOCUMENTS

| | | | |
|---|---|---|---|
| 3,093,579 | 6/1963 | Schmidt | 210/415 |
| 3,126,818 | 3/1964 | Koelsch | 100/112 |
| 3,230,869 | 1/1966 | Hibbel et al. | 210/415 |
| 3,256,995 | 6/1966 | Schmidt et al. | 210/415 X |
| 4,177,234 | 12/1979 | Lowry | 210/415 X |
| 4,257,901 | 3/1981 | Rapa | 210/DIG. 15 |
| 4,328,096 | 5/1982 | Chupka et al. | 210/415 |

FOREIGN PATENT DOCUMENTS

| | | |
|---|---|---|
| 300313 | 4/1965 | Austria . |
| 363407 | 10/1979 | Austria . |
| 861548 | 1/1953 | Fed. Rep. of Germany . |
| 2700542 | 9/1977 | Fed. Rep. of Germany . |
| 2947673 | 8/1981 | Fed. Rep. of Germany . |
| 144229 | 10/1980 | German Democratic Rep. . |
| 780105 | 7/1957 | United Kingdom . |

Primary Examiner—John Adee
Attorney, Agent, or Firm—Toren, McGeady and Stanger

[57] ABSTRACT

For separating material mixtures, in particular of thermoplastic plastics mixed with solids, the plasticized material to be separated is fed into the interior (23) of a hollow cylindrical filter body (7). The filtered material is conveyed via ducts (39, 41, 43) to the outside of the filter body (7). The remaining residue is fed by scrapers (19) on a rotatably driven scraper shaft (17) to an outlet provided with a holding-back device (47). The filter body (7) is composed of a single tubular material piece with a smooth inner surface and an outer surface ribbed in the circumferential direction. The filter openings (37) are worked into the bottoms of circumferential grooves (33) formed in the outer surface between the circumferential webs (35) by laser beam or electron beam processing methods. The elastically pretensioned scrapers (19) are supported via the webs (35) at the interior of a housing (9).

45 Claims, 12 Drawing Figures

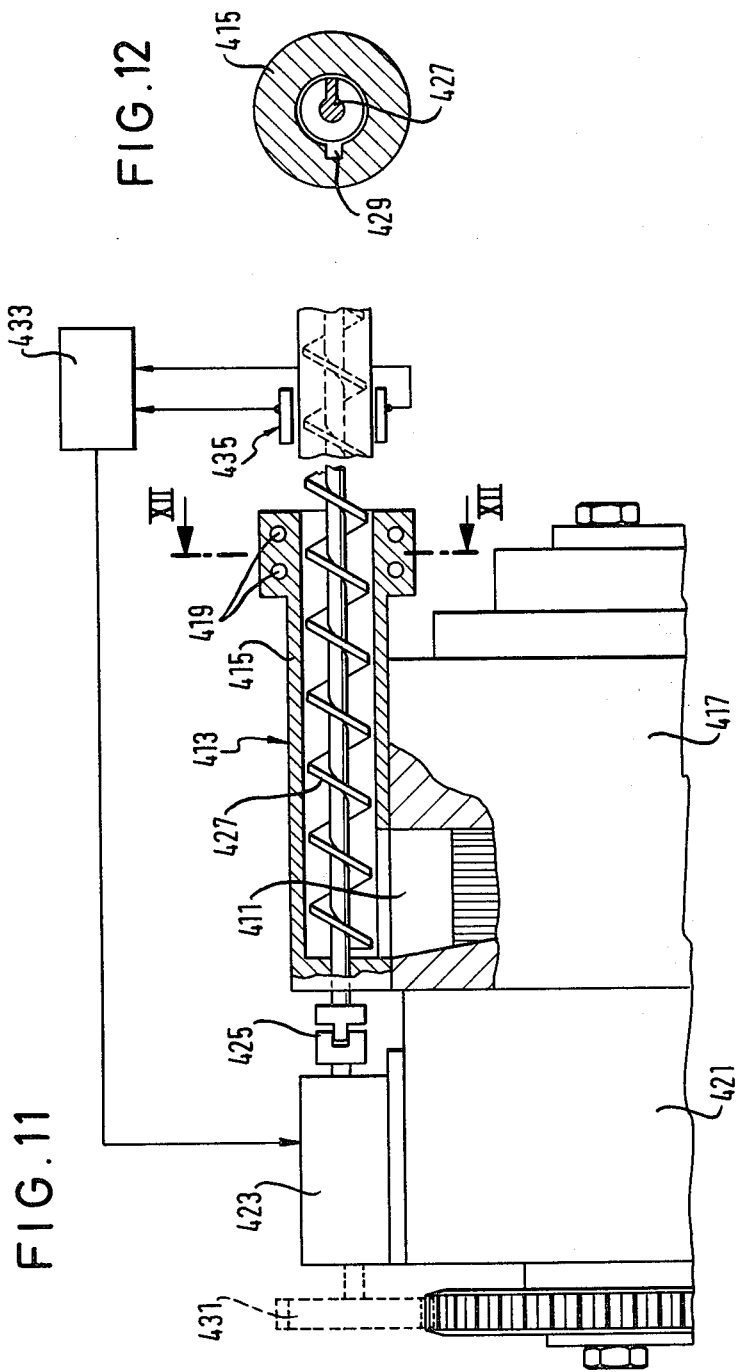

MECHANISM FOR SEPARATING MATERIALS OF VARYING CONSISTENCY

The invention is directed to a mechanism for separating materials of varying consistency, particularly for separating thermoplastic plastics-solid mixtures or mixtures of variously meltable plastics, with a housing, a hollow cylindrical filter body supported in a chamber of the housing with radial filter transmission direction, a scraper shaft rotatingly driven coaxially with respect to the filter body and supported in the housing which scraper shaft axially penetrates the filter body while forming an annular space and carries at least one scraper projecting radially relative to the filter body in the annular space at its casing, with a conveying device feeding the material mixture into the annular space under pressure, a first material outlet connected with the outside of the filter for the filtered material and a second material outlet connected with the inside of the filter with a holding-back characteristic for the residue material.

In a great number of production processes large quantities of waste material result from thermoplastic plastics. However, the plastics wastes are mostly contaminated through metal coatings as in, e.g., the packing industry, or through wire wastes, as in the cable industry. Since thermoplastic plastics can be plasticized by means of heating they lend themselves to reprocessing.

A separating mechanism for reprocessing thermoplastic plastics contaminated by means of metal foil wastes, in particular aluminum, is known from the German Offenlegungsschrift 28 37 621. The plastics mixture to be separated is plasticized in an extruder and pressed through a hollow cylindrical filter body at high pressure. The filtering residue containing the metal wastes blocks the openings of the filter body and is therefore continuously carried out of the filter body interior by means of a cleaning worm. However, it has been shown that the cleaning action of the worm is only insufficient and already after a short operating time the residue can no longer be pushed away from the filter body.

The deficient cleaning action of the worm is substantially produced through the type of filter body used. Conventional filter bodies for separating plastics are composed of a plurality of coaxially arranged disks each of which has a circulating groove in one of its disk surfaces which forms a ring duct with the opposite disk surface of the adjacent ring disk. A plurality of radial grooves is worked into, e.g. pressed into, the annular web remaining between the inner border and the ring groove, which grooves form the filter openings of the filter body when the ring disks are put together. Since exceptionally high pressures of, e.g., 200 bar and more, occur in the filter body, the residue material is pressed in between the disks, despite high axial tension forces of the stack of the filter body, so that it can no longer be removed and the filter body is unusable.

It is the object of the invention to improve the separating mechanism explained above in such a way that the filter body not only better withstands the high interior pressures but also can be better cleaned and a higher throughput of filtered material can be achieved with a higher degree of purity.

This object is met according to the invention in that the filter body is composed of a tubular material piece in whose outer circumferential surface are formed radial recessed portions while forming radial raised portions connected in one piece with the filter body, which radial recessed portions alternate with the raised portions; and in that filter holes radially penetrating the filter body are provided in the recessed portions; in that the raised portions of the filter body contact the inner circumferential surface of the chamber and in that the scraper or scrapers, respectively, are elastically pretensioned radially against the inner circumferential surface of the filter body.

The filter body is composed of a single material piece from which the raised portions are worked out by means of working in the recessed portions. The recessed portions can be, for example, cut, ground or drilled. The scrapers, which are pressed against the inner casing of the filter body with high radial forces, e.g., in the order of magnitude of 300 kg and more, are supported via the raised portions at the housing. Since the bottoms of the recessed portions are connected in one piece with the raised portions, they are more rigid than a smooth-walled filter pipe of the same thickness and can be loaded with a higher interior pressure than the latter. The bottom thickness of the recessed portions can be reduced to 2 mm and less, preferably 1 mm, without difficulty so that filter holes with a diameter of 80 to 200 $\mu$m can be economically produced with laser beam or electron beam processing methods. The depth of the filter holes amounts to less than 10 times the hole diameter.

Conventional filter bodies constructed as disk stacks have only a single row of holes per disk at their inner circumference. In filter bodies used in the framework of the invention, on the other hand, a plurality of filter holes can be burned into the recessed portions by means of laser beam or electron beam processing methods. The filter output can therefore be increased relative to conventional filter bodies.

In a preferred embodiment form the raised portions are arranged in such a way that the scrapers are supported at the inner circumferential surface of the chamber in every rotational position of the scraper shaft via several raised portions distributed along the scraper. In this way the scraper, which is outwardly pretensioned with high radial force, is prevented from supporting itself exclusively on the relatively thin-walled bottom of the recessed portions which could lead to damage. The recessed portions can be formed by means of a plurality of circumferential grooves or by means of at least one helical groove encompassing the filter body. In addition, the webs formed in this manner between the grooves and extending substantially in a circumferential direction improve the filter body's protection against bursting. The scrapers extend in this case diagonally or transversely relative to the grooves. In place of grooves, a plurality of recessed portions, provided in particular in a uniform grid, can be, e.g., drilled in, which recessed portions are separated from one another by means of raised portions on all sides along the outer circumferential surface of the filter body. The raised portions changing into one another form a network which reinforces the filter body axially as well as in the circumferential direction.

It has been shown that the inner casing of the filter can only be sufficiently cleansed of residue material when the scrapers are exactly adapted to the shape of the inner casing of the filter and are pressed against the inner casing with high contact pressure force. For this purpose, the scrapers must be guided at the scraper shaft so as to be radially movable so that they can follow a possible unevenness of the inner casing of the filter. Tests have shown that the residue material bakes the scrapers in their guidings at the scraper shaft so that they can no longer be moved even by strong springs. The scrapers thus lose their cleaning ability.

It is another goal of the invention to show a constructionally simple way of preventing the scrapers from being baked into the scraper shaft.

This is achieved in a separating mechanism of the type discussed in the beginning in that each of the scrapers guided in the scraper shaft so as to be radially movable is elastically pretensioned radially outwardly from the interior of the scraper shaft via a pin displaceably guided in a narrow-fitting, radial borehole of the scraper shaft. The pin has a relatively small diameter so that the gap circumference length between the pin and the borehole remains relatively small and can be well sealed. In any case, the gap circumference length is substantially smaller than the gap circumference length of the scrapers directly guided in the scraper shaft. The scrapers can fit in the guidings with a comparatively large play so that they cannot be baked on. Even if the pins should be baked into the boreholes, the springs can overcome the resistance because of the small gap circumference length. The improvement of the pretensioning of the scrapers explained above can be employed preferably in the filter body of the type according to the invention. However, it has a significance reaching beyond this and can also be employed in filter bodies constructed differently, for example, in filter disk stacks.

Each of the pins can be acted upon by a separate compression spring which sits in a radial borehole of the scraper shaft in which it is insertable from the outside. In this case, the pin is guided in a sleeve so as to be narrow-fitting but radially displaceable, the sleeve being, in turn, displaceable in the borehole. Even if the sleeve bakes into the borehole of the scraper shaft the compression spring can overcome the clamping forces of the pin which is possibly baked into the sleeve.

In order to protect the compression spring against residue material the former is preferably arranged within the sleeve and supported at a pressure piece fastened at the radially inner end of the sleeve. The pressure piece is sealed against the sleeve and the sleeve is preferably filled with fluid or plastic material in order to prevent the penetration of residue material between the pin and the sleeve.

In order to be able to change the filter body when the compression springs are relaxed, a cam stick with radially projecting cams is preferably arranged in the scraper shaft so as to be axially displaceable. The compression springs are arranged between the scraper and the cam stick and can be tensioned or relaxed, respectively, by means of axial displacement of the cams relative to the compression springs.

As already mentioned, the scrapers must be pressed against the inner casing of the filter body with relatively high force. There is also often no room in the interior of the scraper shaft for correspondingly strong compression springs. Therefore, it is provided in a preferred embodiment form that each pin is connected with a piston which is radially displaceable in a hydraulic or pneumatic cylinder arranged in the scraper shaft on the radially inner side of the pin. The piston can be formed here by means of the radially inner end of the pin or a separate piston can be provided. In order to be able to produce high pressure forces the piston diameter is preferably larger than the diameter of the pin in the area of the borehole guiding it. It is advisable that all cylinders be fed from a common hydraulic or pneumatic pressure source.

The residue material is carried axially out of the annular space between the scraper shaft and the filter body for the sake of simplicity. Of course, this requires that the distances over which the residue material must be transported be relatively large. In many cases of application the cleaning action of the scrapers is not sufficient for such long transporting distances, so that the filter body is already blocked and unusable after a short period of operation. Moreover, if the residue material additionally contains very hard residues, such as, e.g., chrome or the like, the scrapers and the filter body are greatly stressed so that they become unusable already after a short period of operation.

Another goal of the invention is to improve the known separating mechanism explained in the beginning in such a way that the residue material can be completely removed from the inside of the filter in continuous operation as well and the blockage and excessive wear of the filter body by means of accumulations of residue is avoided. This is achieved in that at least one outlet opening of the second material outlet is provided in the orbit or its circumferential elongation of the scraper or scrapers, respectively, in each case, which outlet opening radially penetrates the filter body.

In contrast to conventional separating mechanisms in which the cleaning worm carries away the residue material over the entire axial length of the filter body during several revolutions, the scrapers, according to the preceding improvement, feed the residue material to the material outlet by the shortest distance. The residue material must not be removed from the filter surface, but can leave the filter interior through the filter surface. This improvement is not only of significance in separating mechanisms with a filter body of the type explained above manufactured from a single material piece, but can also be employed in other filter bodies, for example, in filter disk stacks.

In a preferred embodiment form of the last-named improvement it is provided that a reversing drive reciprocally moves the scraper shaft with alternating rotational direction over a pregiven rotational angle smaller than 360° and that each of the outlet openings is arranged adjacent to one another in the circumferential direction outside the movement paths of the scrapers determined by means of this rotational angle. The scrapers are thus not moved away over the outlet opening but preferably only until its border. Because of the alternating rotational direction the inner casing of the filter is cleaned better. It is advisable that scrapers with separate scraping edges for the two rotational directions be employed.

The scraper shaft carries preferably several scrapers arranged next to one another in an axial direction yet offset relative to one another, at most, by the axial width of their movement paths. Each of the scrapers wipes only a part of the inner casing of the filter. However, the totality of the scrapers completely cleans the inner casing. Because of the segmentation of the scraper edges thereby achieved, the contour of the edges can be better adapted to and can better press against the inner casing of the filter.

In an advisable embodiment form it is provided that an outlet opening is assigned to each scraper and that scrapers arranged next to one another in an axial direction and outlet openings in the circumferential direction are arranged so as to be offset by 180°. The outlet openings to be constructed in particular as axially extending slots accordingly overlap only a part of the entire axial length which benefits the strength of the filter body.

However, the scrapers can also be arranged closely adjacent and next to one another in an axial direction in a row. This manner of arrangement is particularly advantageous if two rows of scrapers arranged next to one another in zigzag form in radial perspective and offset by 180° are provided at the circumference. The corner points of the zigzag-shaped rows should lie opposite one another in a mirror-inverted manner in pairs in the circumferential direction, since two rows of outlet openings offset by 180° in the circumferential direction can then be provided in which the outlet openings of each row are arranged in axial distance from one another and so as to be axially offset relative to the outlet openings of the other row. Here as well, each outlet opening extends only over a part of the axial length of the filter body. Moreover, the scrapers must carry away the material residue only over a distance of less than 180°. The zigzag-shaped manner of arrangement of the scrapers permits outlet openings with relatively large cross-sections and, accordingly, the separation of relatively large solid pieces. Outlet openings with lozenged cross-sections are optimally suited.

The material outlet for the residue material must have holding-back characteristics in order to prevent the residue material, which is free-flowing per se, from flowing away with a too high proportion of unfiltered material because of the high pressure in the filter body. For the separation of material mixtures which contain thermoplastic plastics this can be effected such that the second material outlet carries away the residue material via at least one cooling duct which can be cooled by means of a cooling device and on whose outlet end is provided a cross-sectional narrowing. The cooling device cools the residue material into a mass resisting the interior pressure of the filter body which can support itself at the cross-sectional narrowing and thus closes the cooling duct. In order to guarantee an unimpeded outflow of the residue material, in particular in the area of the cooling device, the ducts of the second material outlet widen conically in the outflow direction.

It is advisable to control the throughput of residue material thermally. This can be effected by means of controlling the cooling device or by means of an additional heating device in the area of the cross-sectional narrowing of the cooling duct. The temperature control is effected preferably as a function of the pressure of the material mixture in the filter body. If the pressure increases the cooling output of the cooling device is lowered or the heating output of the heating device is increased, respectively, in order to facilitate the outflow of the residue material. When the internal pressure of the filter decreases one regulates in the correspondingly converse sense.

In order to control the residue material outflow a dosing worm can also be provided in the second material outlet. In as much as the holding-back characteristics of the dosing worm are already sufficient to produce a sufficient interior pressure of the filter, a cooling device can again be provided which cools the residue material in the area of the dosing worm, in particular, at its outlet, into a mass resisting the interior pressure of the filter. The rigidified mass supports itself at the windings of the worm. Preferably at least one axial groove is provided in the worm casing pipe in the area of the outlet end, which groove prevents the residue mass rigidified in the worm from rotating along with the worm. The throughput of residue material can be controlled via the temperature of the cooling device, but also via the number of revolutions of the dosing worm. Again, the control can be effected as a function of the interior pressure of the filter. To the extent that the material residue contains metal the control of the temperature of the cooling device or of the number of revolutions of the dosing worm is preferably effected as a function of the portion of metal in the residue material which can be measured advisably with a capacitive sensor.

The dosing worm can be constructed in such a way that it carries away the residue material in the entire circumferential area of its worm casing pipe. Since the residue material is to be cooled in the area of the dosing worm, this can lead in particular instances to relatively long and constructionally expensive worm constructions. Embodiment forms may therefore be advantageous in which the second material outlet comprises several outlet ducts distributed over the circumference of the dosing worm in which outlet ducts the dosing worm engages over a part of the radial width of the ducts. The outlet ducts can, without difficulty, be dimensioned wide enough so that relatively large material wastes, e.g., metal wastes, can also be contained in the residue material. Nevertheless, the cooling of the residue material in the outlet ducts is facilitated. It is advisable that the residue material already be extensively cooled already before reaching the dosing worm. The outlet speed is controlled by means of the number of revolutions of the dosing worm whose threads dig into the residue material and hold it back in order to produce a sufficient interior pressure of the filter. The dosing worm is preferably in a drive connection with the scraper shaft via a free-wheel.

The interior pressure of the filter of the separating mechanism achieves very high values, in particular during separation of thermoplastic plastics, e.g., in the order of magnitude of 500 bar. In order to prevent axial pressures on the scraper shaft in this order of magnitude the scraper shaft is preferably supported axially on both sides of the filter body at equally large shaft diameters in the housing.

Constructionally simple embodiment forms result when the scraper shaft penetrates the frame part of the housing at which the filter body is supported on the one axial side and the scraper shaft is coupled with a drive on the other axial side. The annular space formed between the scraper shaft and the filter body continues advisably between the scraper shaft and a shaft pass-through opening into the frame part. A supply duct of the conveying device opens transversely into this continuing annular space. The ducts of the first material outlet through which the filter material is carried away also extend at least sectionally through the frame part. A collecting ring duct can be provided in addition between the frame part and the filter body into which collecting ring duct the ducts of the first material outlet open and through which they are connected with outlet nozzles. The supply and discharge of material is effected from the same axial side of the filter body which can accordingly be exchanged with little expenditure of time.

Figure 4:
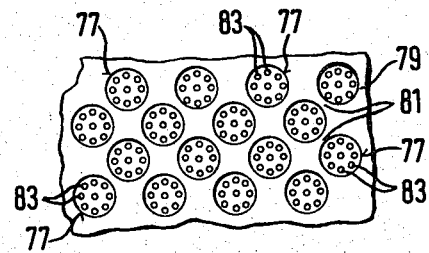
Figure 2:
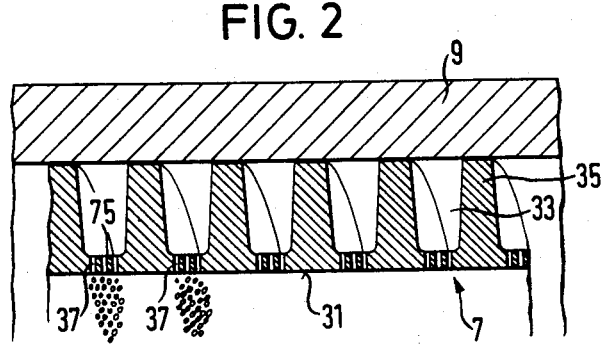
Figure 3:
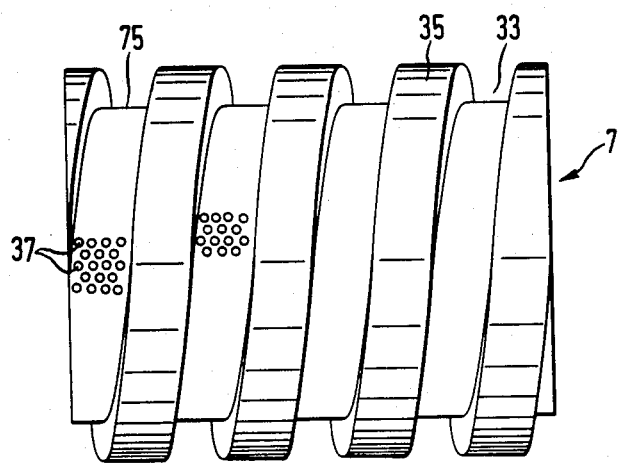
Figure 5:
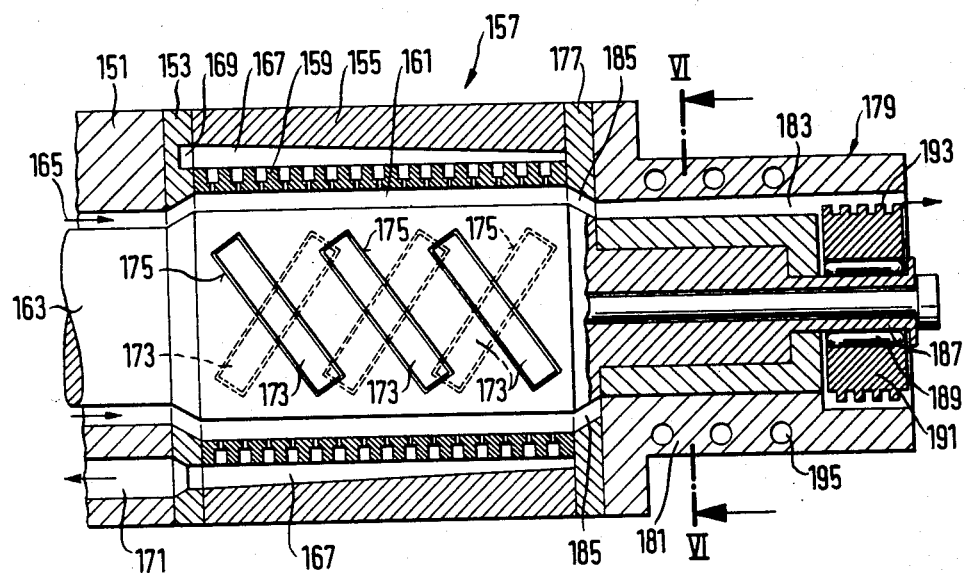
Figure 6:
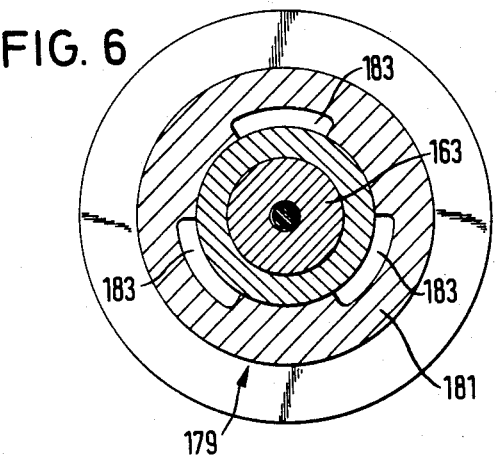
Figure 7:
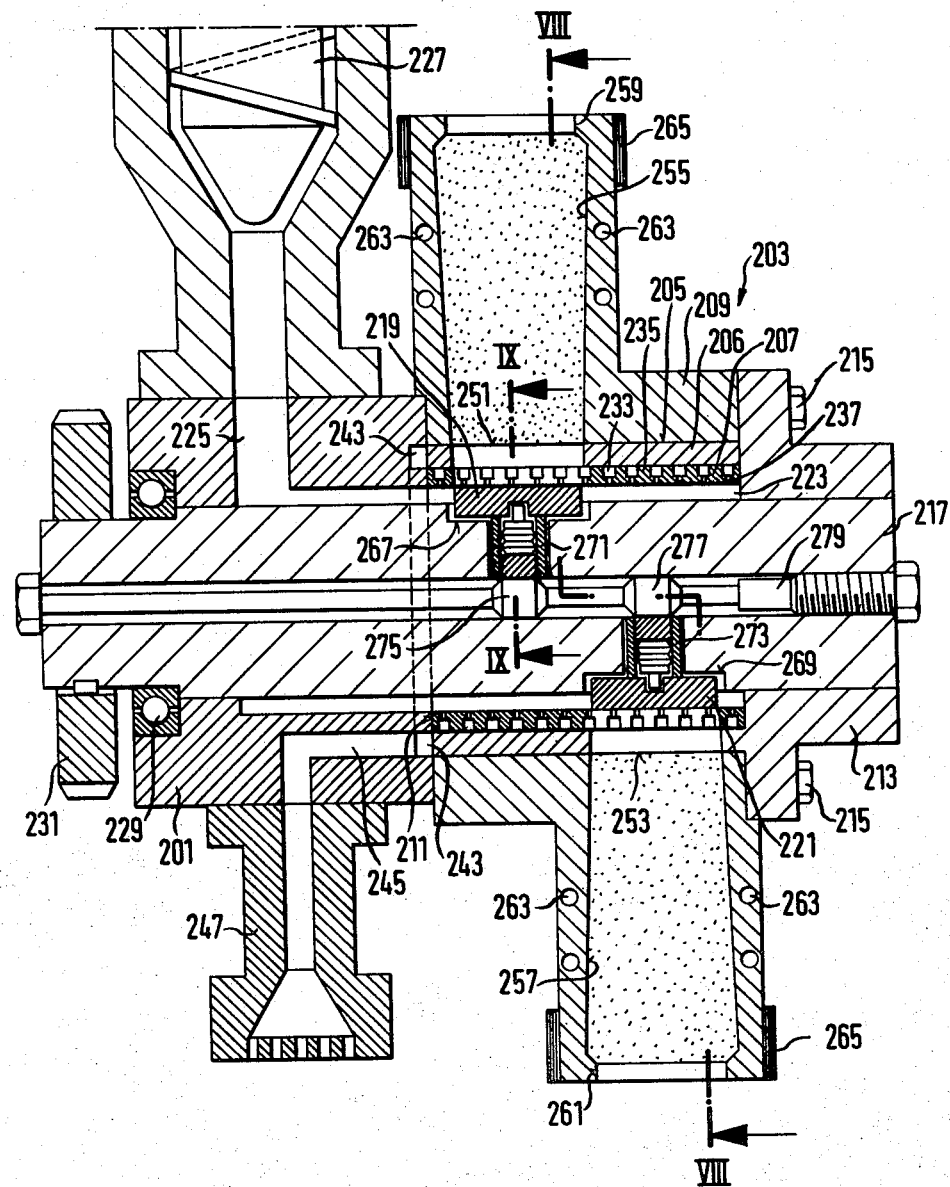
Figure 8:
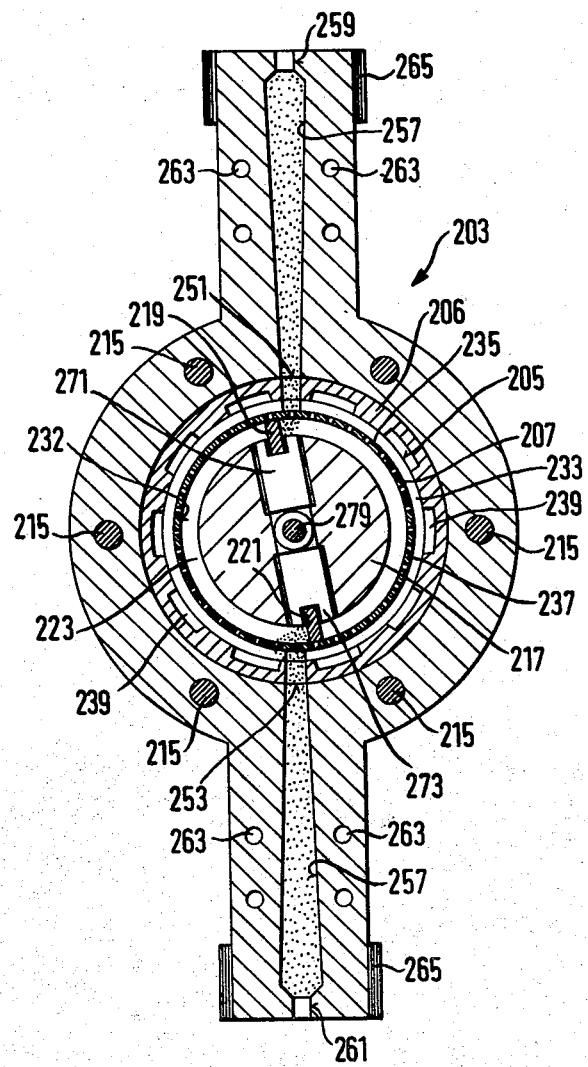
Figure 9:
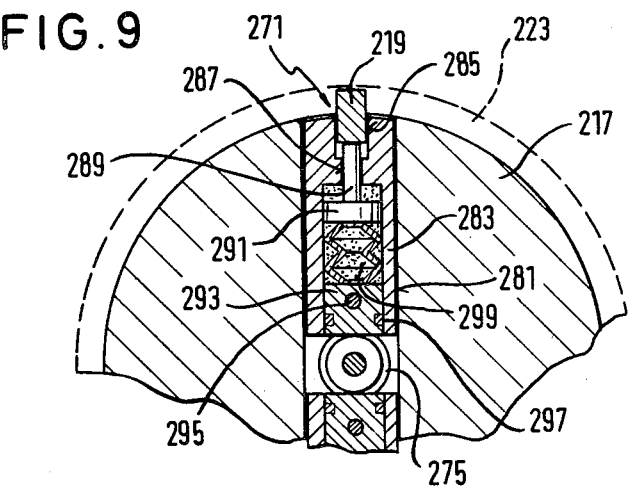
Figure 10:
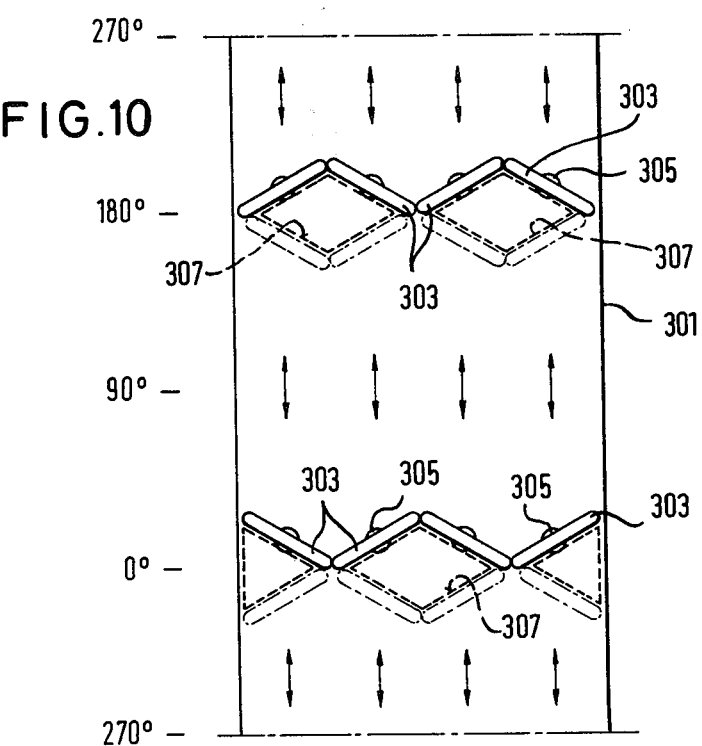

Embodiment examples of the invention will be explained in more detail in the following with the aid of the drawings. Shown are FIG. 1 a schematic axial longitudinal section through a first embodiment form of a separating mechanism for material mixtures which contain thermoplastic plastics;

FIG. 2 an enlarged partial view seen in axial longitudinal section through the filter body of the separating mechanism according to FIG. 1;

FIG. 3 an enlarged (but not to scale) side view of the filter body of the separating mechanism according to FIG. 1;

FIG. 4 a partial top view of the outer surface of another embodiment form of a filter body employable in the separating mechanism according to FIG. 1;

FIG. 5 a schematic axial longitudinal section through a second embodiment form of a separating mechanism for material mixtures which contain thermoplastic plastics;

FIG. 6 a section along line VI—VI through the separating mechanism according to FIG. 5;

FIG. 7 a schematic axial longitudinal section through another embodiment form of a separating mechanism for material mixtures which contain thermoplastic plastics;

FIG. 8 an axial cross-section through the separating mechanism according to FIG. 7 along a line VIII—VIII;

FIG. 9 an axial cross-section through a scraper shaft of the separating mechanism according to FIG. 7 seen along a line IX—IX;

FIG. 10 the schematic, developed view of the circumferential casing of an embodiment form of a scraper shaft, in particular for use in a separating mechanism according to FIG. 7;

FIG. 11 a schematic partial section through a separating mechanism with a material outlet for the residue material diverging from the separating mechanism according to FIG. 7; and FIG. 12 a section along line XII—XII through the separating mechanism according to FIG. 11.

FIG. 1 shows a separating mechanism for reprocessing mixtures of thermoplastic plastics and material wastes with high melting points, in particular metal wastes, in particular copper or aluminum wastes, such as result, for example, in the packing and cable industries. A filter head 3 is fastened at a frame part 1 serving for fastening, which filter head 3 contains a hollow cylindrical filter body 7 in a cylindrical chamber 5. The chamber 5 is defined outwardly by means of a substantially cylindrical housing part 9, a front disk 11 of the frame part 1 and a bearing cover 13 at the side facing away axially from the frame part 1. The bearing cover 13 and the housing part 9 are fastened at the frame part 1 by means of axial screw bolts 15. A scraper shaft 17 is rotatably supported coaxially with respect to the filter body 7 on axially opposite sides of the filter body 7 in the frame part 1 and the bearing cover 13.

The scraper shaft 17 carries at its circumference two rows of scrapers 19 offset relative to one another by 180°, which scrapers 19 elastically contact the inner casing of the filter body 7 with high contact pressure force and with an axial distance from one another. In each case the scrapers 19 extend diagonally with respect to the circumferential direction but are parallel to one another in the rows. The scrapers 19 of the two rows lie diametrically opposite in pairs and are inclined with respect to the circumferential direction in such a way that they feed towards the bearing cover 13 when the scraper shaft 17 rotates.

The diameter of the scraper shaft 17 is smaller than the inner diameter of the filter body 7 in the area of the filter body 7 so that an annular space 23 originates in the area of the filter body 7. The annular space 23 continues into the frame part 1 and is connected within the frame part 1 via a duct 25 extending radially with respect to the scraper shaft 17 with an extruder 27 plasticizing the plastics material mixture and feeding the plastics material mixture under high pressure. The scraper shaft 17 is supported on both sides of the annular space 23 at equally large shaft diameters in the bearing part 1 and the bearing cover 13, respectively, in order not to have to absorb any axial pressure forces. 29 designates a radial main bearing of the scraper shaft 17 on the side of the frame part 1 which side is axially remote of the filter head 3. The scraper shaft 17 exits from the frame part 1 on this side and is connected with a drive mechanism, not shown in more detail.

The filter body 7 is composed of a single, tubular material piece with a smooth inner casing 31 and an outer casing in which a plurality of parallel circumferential grooves 33 are worked in. Circumferential webs 35 remaining between the grooves 33 are supported at the inner casing of the chamber 5 and conduct the contact pressure forces of the scrapers 19 to the housing part 9. A plurality of radial filter openings 37 are provided in the grooves 33 as is shown in particular in FIGS. 2 and 3.

The ring grooves 33 are connected with axial grooves 39 at the inner casing of the chamber 5 which, in turn, open into a ring duct 41 of the front disk 11. A duct 43 extends within the frame part 1 from the ring duct 41 to an outlet nozzle head 45.

The thermoplastic plastics of the material mixture injected into the annular space 23 by the extruder 27 enters through the filter openings 37 of the filter body 7 into the ring grooves 33 from where it is carried away via the ducts 39, the ring duct 41, the duct 43 and the outlet nozzle head 45.

The residue material containing the solid wastes collects at the inner casing of the filter body 7. It is transported from the scrapers 19 to a holding-back worm 47 arranged coaxially with the scraper shaft 17 and non-rotatably connected with the latter. A cooling device, indicated by means of cooling ducts 49, cools the thermoplastic residue component parts of the residue material in the worm threads of the holding-back worm to the extent that it cannot be pushed out by the pressure of the plasticized mass of the filter interior. The pushing-out speed is substantially determined by means of the number of revolutions of the holding-back worm 47. In the area where the worm of the holding-back worm 47 begins, the annular space 23 reduces to a feed cone 51 which overlaps the circumferential casing of the holding-back worm 47 and feeds the residue material into the first worm thread radially from the outside in order to prevent a blockage of the worm inlet.

The scrapers 19, guided so as to be radially displaceable, sit in grooves 53 of the scraper shaft 17 extending diagonally relative to the circumferential direction. A radial borehole 55, in which a pin 57 is guided in a narrow-fitting manner and so as to be radially displaceable, opens into the groove 53. The pin 57 has a substantially smaller cross-section surface than the bottom surface of the groove 53 in order to prevent baking on. The pin 57 of each scraper 19 is supported at a piston 59 which is provided in a radial cylinder borehole 61 of a cylindrical insert 63 coaxially contained in the scraper shaft. The pistons 59 outwardly seal a common hydraulic space 65 of the insert 63 which hydraulic space 65 is filled with hydraulic fluid. The hydraulic space 65 is connected with a cylinder 67 in which a piston 69 is pretensioned by a compression spring 71. The surface of the piston 69 is smaller than the surface of each of the pistons 59 in order to produce a transmission of force of the forces produced by the compression spring 71 and acting on the scrapers 19 via the pins 57. The compression spring 71 can be relaxed in order to be able to exchange the filter body 7 when the scrapers 19 are relieved of load. A gas pressure reservoir, or the like, can also be used in place of the compression spring 71 for producing the elastic contact pressure forces. In particular in the area of the filter body 7, the insert 63 has a smaller diameter than the opening of the scraper shaft 17 surrounding it. A cooling annular space arises in this way which can optionally be connected at a cooling circulation in addition.

The outflow speed of the residue material out of the holding-back worm 47 can be controlled via the cooling output of the cooling device 49. The cooling output is preferably controlled as a function of the interior pressure of the plasticized material, in particular in the annular space 23. To the extent that the residue material contains metal wastes the temperature control can also be effected as a function of the portion of material.

FIGS. 2 and 3 show details of the filter body 7. The circumferential grooves 33, which are formed in the embodiment examples shown by means of a single helical groove, are worked into the outer casing of a hollow cylinder composed of a single material piece, for example, by means of chip removing fabrication or grinding. But the circumferential grooves 33 can also be annularly closed in the circumferential direction or several helical grooves extending parallel to one another can be provided, respectively. The circumferential webs 35 remaining between the grooves 33 are supported at the casing of the housing part 9. The bottom 75 of each circumferential groove 33, which bottom 75 is thin-walled compared with the radial height of the circumferential webs 35, has a plurality of filter holes 37 through which the filtered material is carried away. The filter holes 37 are arranged in several rows along the circumferential grooves 33 wherein adjacent rows of holes are offset relative to one another in the longitudinal direction of the grooves.

The hole diameter of the filter holes is selected smaller than 0.2 mm, preferably approximately 0.1 mm. In order to be able to produce such small hole diameters economically with laser beam or electron beam processing methods the radial thickness of the bottom 75 of each circumferential groove 33 is dimensioned, at most, equal to ten times the hole diameter. The transverse width of each groove 33 is chosen in such a way that the bottom 75 is reinforced by means of the neighboring adjacent area of the circumferential webs 35 even for high interior pressures of the filter in the area of 200 to 500 bar despite a small wall thickness. With bottom wall thicknesses in the order of magnitude of 1 mm cross-sectional dimensions of the grooves 33 in the axial direction of the filter body 7 of approximately 2 mm have shown themselves to be usable for keeping the inner casing 31 inherently stable and, accordingly, cleanable by means of the scraper despite the load resulting from the interior pressure of the filter. In any case, the scrapers extend diagonally or transversely relative to the grooves.

FIG. 4 shows another embodiment form of a filter body in which, in place of the ring grooves, recessed portions 77 arranged in a grid are worked into, e.g., drilled into, the outer casing of a hollow cylindrical filter body 79 composed of a single material piece. The recessed portions 77 are separated from one another on the surface of the outer casing of the filter body 79 on all sides by means of a network of webs 81 which are supported at the inner casing of the housing chamber enclosing the filter body 79 and, according to the separating mechanism according to FIG. 1, conduct the radial contact pressure of the scrapers to the housing. The diameter of the openings 77 and their mutual distance is chosen in such a way that the webs 81 act on the bottoms of the recessed portions 77 so as to reinforce them. Moreover, the distribution of the webs 77 is chosen in such a way that each of the scrapers of the separating mechanism are in turn supported in common in every rotational position of the scraper shaft via several webs 81 in order to avoid damages to the bottoms of the recessed portions 77. The bottoms of the recessed portions each contain a plurality of filter holes 83 with a diameter between 80 and 200 μm. The bottom of each recessed portion 77 is at most ten times as thick as the hole diameter of the filter holes 83 produced by means of laser beam or electron beam processing methods, respectively.

FIGS. 5 and 6 show another embodiment form of a separating mechanism with a frame part 151 at which a housing cylinder 155 of a filter head, designated generally by 157, is adjoined via an intermediate ring 153. The housing cylinder 155 encloses a hollow cylindrical filter body 159 which is coaxially rotatably penetrated by a scraper shaft 163 while forming an annular space 161. The annular space 161 continues into the frame part 151 from where the material mixture to be separated is fed with high pressure in the direction of arrow 165 by an extruder, not shown in detail. Outside the filter body 159 the housing cylinder 155 contains axially extending ducts 167 which open into a ring duct 169 of the intermediate ring 153. The ring duct 169 is connected with an outlet nozzle head, not shown in detail, via a duct 171 extending in the frame part 151, through which outlet nozzle head the filtered material is carried away. The ducts 167 widen in the axial direction towards the ring duct 169 in order to guarantee an undisturbed outflow of the filtered material. The filter body 159 has the structure explained with the aid of FIGS. 1 through 4.

The scraper shaft carries two rows of scrapers 173 offset relative to one anpther by 180°. The scrapers 173 of each row are arranged at an axial distance from one another and each extends diagonally with respect to the circumferential direction yet parallel to one another. The scrapers 173 of the two rows lie diametrically opposite one another in pairs and are inclined with respect to the circumferential direction in such a way that they convey in the same axial direction during rotation of the scraper shaft 163.

The scrapers 173 sit in guide grooves 175 and are tensioned by means of hydraulic or pneumatic pistons of the type described with the aid of FIG. 1. The description of FIG. 1 is referred to to this extent.

At that end of the housing cylinder 155 located axially opposite the frame part 151 an outlet holding-back device 179 is adjoined coaxially with respect to the scraper shaft via an intermediate ring 177, which outlet holding-back device holds back the residue material removed by means of the scraper 173 from the inner casing of the filter body 159 and thus makes it possible to build up a high interior pressure of the filter. The outlet holding-back device 179 comprises a hollow cylinder 181 flanged at the housing cylinder 155 in which hollow cylinder 181 that end of the scraper shaft 163 which is remote of the frame part is rotatably supported. The shaft diameter of this bearing is again selected so as to be equal to the bearing diameter on the frame part side in order to avoid axial pressures on the scraper shaft 163. The inner casing of the hollow cylinder 181 has several, in this case, three, axially extending ducts 183 distributed along the circumference (FIG. 6) which are connected via ducts 185 of the intermediate ring 177 with the annular space 171 between the filter body 159 and the scraper shaft 163. The ducts 183 widen towards the outlet end. A worm wheel 191 with a pregiven rotational direction is rotatably supported at a shoulder 187 at the outlet end of the scraper shaft 163 via a free-wheel roller gear unit 189. The worm threads 193 of the worm wheel 191 project into the ducts 183 and dig into the residue material flowing through the ducts 183. The thermoplastic plastics portion of the residue material is cooled into a mass holding back at the worm threads 193 by a cooling device indicated by means of cooling ducts 195.

The scraper shaft 163 is driven with alternating rotational direction, wherein, because of the free running characteristics of the worm 191, the relation of revolutions per rotational direction determines the removal of the compacted residue material by means of the worm 191 equipped with free running characteristics in one of the rotational directions. The worm threads 193 thus "screw" out the residue material rigidified in the ducts 183.

FIGS. 7 and 8 show another embodiment form of a separating mechanism for reprocessing mixtures of thermoplastic plastics and material wastes with higher melting points. Very hard, abrasive metal wastes in particular, such as, e.g., chrome wastes and the like, can be separated by means of this separating mechanism. A filter head 203 is fastened at a frame part 201 serving for fastening, which filter head 203 contains a hollow cylindrical filter body 207 in a cylindrical chamber 205 of a hollow cylinder 206. The chamber 205 is outwardly defined on the side axially remote of the frame part 201 by means of the hollow cylinder 206 of an end face 211 of the frame part 201, which hollow cylinder 206 is received by a substantially cylindrical housing part 209, and by means of a bearing cover 213. The bearing cover 213 and the housing part 209 are fastened at the frame part 201 by means of axial screw bolts 215. A scraper shaft 217 is rotatably supported coaxially with the filter body 207 in the frame part 201 and the bearing cover 213 on axially opposite sides of the filter body 207. The scraper shaft 217 carries the scrapers 219, 221 at its circumference which contact the inner casing of the filter body 207 in a spring-loaded manner and are offset relative to one another axially and in the circumferential direction and will be explained in more detail in the following. The diameter of the scraper shaft 217 is smaller than the inner diameter of the filter body 267 in the area of the filter body 207 so that an annular space 223 arises in the area of the filter body 207. The annular space 223 continues into the frame part 201 and is connected with an extruder 227 plasticizing the plastics material mixture and feeding the latter under high pressure via a duct 225 extending radially with respect to the scraper shaft 217 within the frame part 201. The scraper shaft 217 is supported on both sides of the annular space 223 at equally large shaft diameters in the bearing part 201 and the bearing cover 213, respectively, in order not to have to absorb any axial pressure forces. 229 designates a radial main bearing of the scraper shaft 217 on the side of the frame part 201 axially remote of the filter head 203. On this side the scraper shaft 217 exits from the frame part 201 and is connected with a drive mechanism (not shown in more detail), for example, via a toothed wheel 231.

The filter body 207 is composed in accordance with the embodiment form according to FIG. 1 of a single, tubular material piece with a smooth inner casing 231 and an outer casing in which a plurality of parallel circumferential grooves 233 are worked in. Circumferential webs 235 remaining between the grooves 233 are supported at the inner casing of the hollow cylinder 206 and conduct the contact pressure forces of the scrapers 219, 221 to the housing part 209. A plurality of radial filter openings 237 are provided in the grooves 233 as was explained in detail with the aid of FIGS. 2 and 3.

The ring grooves 233 are connected with axial grooves 239 at the inner casing of the hollow support cylinder 206 which, in turn, opens into a ring duct 243 of the end face 211. A duct 245 extends from the ring duct 243 within the frame part 201 to an outlet nozzle head 247.

The thermoplastic plastics in the material mixture injected into the annular space 223 by the extruder 227 enters through the filter openings 237 of the filter body 207 into the ring grooves 235 from where it is carried away via axial ducts 241, the ring duct 243, the duct 245 and the outlet nozzle head 247.

The residue material containing the solid wastes collects at the inner casing of the filter body 207. It is transported from the scrapers 219, 221 to outlet openings 251, 253 which radially penetrate the filter body 207. The outlet openings 251,253 are constructed as axially extending slots and lie in the circumferential elongation of the movement paths of the scrapers 219, 221. One of these outlet openings 251, 253 is assigned to each of the scrapers 219, 221. The scrapers accordingly feed the residue material to the outlet openings 251, 253 by the shortest path.

The scrapers 219, 221 are offset relative to one another by their widths in the axial direction of the scraper shaft 217 so that all the scrapers clean the entire inner casing of the filter body 207. The movement paths of the scrapers 219, 221 can optionally axially overlap one another slightly. The scrapers extend substantially in the axial direction of the scraper shaft 17.

The outlet openings 251, 253 extend only over a part of the axial length of the filter body 207. Axially adjacent outlet openings 251, 253 are angularly offset relative to one another, preferably by 180°, in order not to weaken too much the strength of the filter body 207.

The scraper shaft 217 is rotatingly driven in a reciprocal rotational movement by less than 360°, wherein the scrapers 219, 221 convey the residue material in both rotational directions to the respectively assigned outlet openings 251 and 253, respectively. The rotational angle is dimensioned in such a way that the scrapers 219, 221 are not moved away over the outlet opening 251, 253. In accordance with the manner of arrangement of the outlet openings 251, 253 axially adjacent scrapers are also angularly offset by 180°.

In the embodiment example shown, two scrapers are provided; however, more scrapers can also be present, wherein axially adjacent outlet openings and appertaining scrapers can also be angularly offset relative to one another under an angle smaller than 180°.

Substantially radially extending outlet ducts 255, 257 adjoin the outlet openings 251, 253 of the filter body 207, through which outlet ducts 255, 257 the residue material is conducted. The outlet ducts 255, 257 are provided with a cross-sectional narrowing 259 and 261, respectively, at their outlet end. A cooling device indicated by means of cooling ducts 263 cools the portion of thermoplastic plastics contained in the residue material into a solid mass which is supported at the cross-sectional narrowing 259 and 261, respectively. The cross-sectional narrowings 259, 261 thus prevent the undisturbed flow of the residue material through the outlet openings 255, 257 so that, because of the holding back, the high interior pressure of the filter necessary for separating the material mixture can build up. In order to make possible an unimpeded outflow of the residue material through the ducts 255, 257 until the cross-sectional narrowings 259, 261, ducts 255, 257 widen conically toward the outlet end.

A heating device 265 is provided in each instance in the area of the cross-sectional narrowing 259 and 261, respectively, whose heating output is controlled as a function of the interior pressure of the filter by means of a control circuit, not shown in more detail. The control circuit, at the same time, also controls the cooling output of the cooling device 263. In place of the interior pressure of the filter, another parameter can also be used as a command variable of the control in residue materials containing metal, for example, the metal portion, which can be measured in particular by means of a capacitive sensor.

The scrapers 219, 221 must be pressed against the inner casing of the filter body 207 with high radial force. The scrapers 219, 221 are guided radially movably for this purpose in axially extending openings 267, 269 of the scraper shaft 217. Pressure pistons 271, 273, telescopically elastic in themselves, elastically pretension the scrapers 219, 221 outwardly. The pressure pistons 271, 273 are gripped between the scrapers 219 and 221, respectively, on the one side, and radial cams 275 and 277 of an axially displaceable cam stick 279 coaxially penetrating the scraper shaft 217, on the other side. The pressure pistons 271, 273 can be relaxed by means of axial displacement of the cam stick 279 in order to insert or change, respectively, the filter body 207. The insertion of the filter body 207 accordingly becomes very simple, particularly because the duct 225 of the extruder 227 and the duct 245 of the nozzle head 247 open into the same axial side of the filter head 203 and the filter body 207 is built together into a stack which can be changed as a unit.

FIG. 9 shows details of the pressure piston 271. The pressure piston 273 is constructed in a corresponding manner. The pressure piston 271 sits in a radial borehole 281 of the scraper shaft 217 and is radially insertable from the outside together with the scraper 219. The pressure piston 271 comprises a sleeve 283 displaceably guided in the borehole 281, which sleeve carries a guide slot 285 for the scraper 219 on its radially outer end. The sleeve 283 narrows into a borehole 287 radially within the guide slot, in which borehole 287 a pin 289 sits in a narrow-fitting but radially displaceable manner, which pin contacts the scraper 219 at its outer end and carries a head 291 at its inner end. The inner end of the sleeve 283 is closed by a pressure piece 293 which is held with a pin 295 in the sleeve 283 and is sealed towards the sleeve 283 by a sealing ring 297. A cup spring stack 299 is gripped between the head 291 and the pressure piece 293. The chamber enclosed by the interior of the sleeve 283 and the pressure piece 293 is filled up with fluid or plastic material which prevents the penetration of the material mixture to be filtered. The cup springs stacks 299 are relaxed and the pins 291 are forced radially outwardly during insertion of the pressure pistons 271, 273.

The pressure pistons 271, 273 engage in the cross-sectional reductions of the cam stick 279 axially lateral of the cams 275, 277. The sleeves 283 can in this way be entirely pushed into the boreholes 281 to the extent that the scrapers 219, 221 can be introduced into the filter body 207 so as to work smoothly. The sleeves 283 are forced outward by means of axial displacement of the cam stick 279 and the cup spring stacks 299 are tensioned via the pins 291. Since the circumference of the pins 291 is substantially smaller than the circumference of the sleeves 293, the pins 291 cannot bake on in long term operation to the extent that they would resist the pressure of the cup spring stacks 299. The pins 291 and, optionally, the boreholes 289 can be ground to an exact fit. Since the relative position of the sleeve 283 no longer changes after tensioning, the baking on of the sleeve 283 at the scraper shaft 217 in long term operations does not have a disadvantageous effect.

FIG. 10 shows the developed view of another embodiment form of a scraper shaft 301 such as can be employed, for example, in a separating mechanism of FIGS. 1 through 3. The scraper shaft 301 comprises two rows of scrapers 303 offset relative to one another by 180° which are radially movably pretensioned against the filter body at pressure pistons 305 similar to the pressure pistons of FIG. 9. The scrapers 303 of each row are arranged in zigzag form and, specifically, in such a way that in each instance two scrapers lie diametrically opposite one another in a plane extending diagonally to the rotational axis of the scraper shaft 301. The ends of the scrapers 303 of each row contact each other or approach each other up to a small distance. The tips of the zigzag-shaped rows lie opposite one another in the circumferential direction.

The filter body, which is not shown in more detail, has two diametrically opposite rows of outlet openings 307 which are indicated in FIG. 10 with dashed lines. The outlet openings are offset relative to one another in the axial direction of the scraper shafts 301 and lie substantially in the continuation of the movement paths of the tips of the zigzag-shaped scraper rows.

The scraper shaft 301 is periodically moved reciprocally by a rotational drive, not shown in more detail, by approximately less than 180°, wherein the scrapers 303 convey the residue material to the outlet openings 307 over the relatively short distance of a half circumferential length. The outlet openings 307 are preferably lozenge-shaped and, accordingly, have comparatively large cross-sections over which relatively large solid residue material parts can be carried away as well. The rotational movement of the scraper shaft 301 is angularly offset in such a way that the scrapers 303 are not moved away over the outlet openings 307.

FIGS. 11 and 12 show another embodiment form of an outlet control such as can be employed alternatively in a separating mechanism according to FIGS. 7 through 10. A dosing worm 413 adjoins the outlet openings 411 for the residue material, which outlet openings 411 are optionally connected with one another via a collecting duct and of which only one is shown in FIG. 11. The worm casing pipe 415 of the dosing worm 413 is supported at the filter head 417 and carries a cooling device, indicated by means of cooling ducts 419, in the area of its outlet. A frame part 421 holding the filter head 417 carries a drive mechanism 423 which is coupled with the worm 427 of the dosing worm via a claw clutch 425. The cooling device 419 cools the thermoplastic plastics contained in the residue material into a solid mass which engages in an axial groove 429 (FIG. 12) at the outlet of the worm casing pipe 415. The groove 429 prevents the rotation of the rigidified plastics residue mass, whereby the rigidified mass is "screwed out" of the worm casing pipe 415 in a rope-like shape during rotation of the worm 427. Insofar as the drive movement of the dosing worm 413 is conducted from the drive of the scraper shaft (not shown in more detail), such as is indicated in 431 by means of a toothed wheel drawn in a dashed line, the drive 423 obtains a free-running which converts the reciprocal movement of the scraper shaft into a rotational movement in the same direction. Since the dosing worm 413 is driven via the clutch 425, the filter head 417 can be disassembled without difficulty in accordance to the embodiment forms of FIGS. 1 or 7.

The drive 423 of the dosing worm 413 is controlled via a control 433 with respect to its mean number of revolutions as a function of the interior pressure of the filter or, with residue material containing metal, as a function of the metal portion. The drive 423 is optionally connected for this purpose via a controllable clutch with the dosing worm 423. In order to detect the metal portion the dosing worm 413 extrudes the residue material between two metal surfaces of a capacitive sensor 435. In addition to, or in place of, the control of the worm operation, the control 433 can control the cooling output of the cooling device 419.

We claim:

1. Mechanism for separating material in thermoplastic plastics material-solid material mixtures or mixtures of variously meltable plastics, comprising a housing (1, 3; 151, 155; 201, 203) forming a chamber (5), an axially extending hollow cylindrical filter body (7; 159; 207) supported in said chamber (5) of said housing (1, 3; 151, 155; 201, 203) and arranged with a filter transmission direction extending radially of the axial direction thereof, a scraper shaft (17; 163; 217) arranged coaxially with and rotatably mounted within said filter body (7; 159; 207) and supported in said housing (1, 3; 151, 153; 201, 203), said scraper shaft (17; 163; 217) extends axially through said filter body (7; 159; 207) and the surface of said scraper shaft is spaced inwardly from the inside surface of said hollow filter body forming an annular space (23; 161; 223) therebetween and carrying at least one scraper (19; 103; 173; 219, 221) projecting radially outwardly into said annular space (23; 61; 223), a conveying device (27; 227) for feeding the material mixture to be separated into said annular space (23; 161; 223) under pressure, a first material outlet (45; 71; 247) connected with the outside of said filter body for receiving the filtered material and a second material outlet (47; 183; 255, 257) connected with the inside of said filter body with a holding-back characteristic for the residue material retained in said filter body, characterized in that said filter body (7; 159; 207) comprises an unitary tubular material piece having an inner and an outer circumferential surface, with alternating radially directed recessed portions (33; 77; 233) and radially directed webs (35; 77; 235) formed in the outer circumferencial surface and being monolithic with said filter body (7; 159; 207); said filter body having filter holes (37; 83; 237) radially penetrating said filter body (7; 159; 207) between the inside surface of said tubular material piece and the base of said recessed portions (33; 77; 233); said webs (35; 77; 235) of said filter body (7; 159; 207) contact the inner circumferential surface of said chamber (5); and said at least one scraper (19; 103; 173; 219, 221) is radially elastically pretensioned against the inner circumferential surface of said filter body (7; 159; 207).

2. Mechanism according to claim 1, characterized in that said webs (35; 77; 235) are arranged so that said at least one scraper (19; 103; 173; 219, 221) is supported in every rotational position of said scraper shaft (17; 163; 217) at the inner circumferential surface of said chamber (5) via a plurality of said webs (35; 77; 235).

3. Mechanism according to claim 2, characterized in that said recessed portions are formed as one of a plurality of circumferential grooves and at least one helical groove (33; 233) encircling said filter body (7; 159; 207) and said scrapers (19; 103; 173; 219, 221) are arranged so as to extend transversely across said grooves (33; 233).

4. Mechanism according to claim 3, characterized in that several rows of filter (37) are provided next to one another in the base of said grooves (33; 233).

5. Mechanism according to claim 4, characterized in that said filter holes in adjacent said rows are offset relative to one another in the direction of said rows.

6. Mechanism according to claim 2, characterized in that said recessed portions (77) are separated from one another around the outer circumferential surface of said filter body (7; 159; 207) on all sides by said webs (81).

7. Mechanism according to claim 1, characterized in that the radial wall thickness of said filter body (7; 159; 207) at the base of said recessed portions is approximately equal to 10-times the diameter of said filter holes (37; 237).

8. Mechanism according to claim 1, characterized in that the diameter of said filter holes (37; 237) is approximately 80 to 200 $\mu$m.

9. Mechanism according to claim 1, characterized in that a plurality of said scrapers are carried on said scraper shaft and each scraper (19; 103; 173; 219, 221) is guided so as to be radially movable in said scraper shaft (17; 163; 217) and is elastically pretensioned radially outwardly from the interior of said scraper shaft in each instance via a pin (57; 289) displaceably guided in a narrow-fitting radial borehole (55; 287) of said scraper shaft.

10. Mechanism according to claim 9, characterized in that a support member (277) is in said scraper shaft (217), a radially acting compression spring (299) positioned between said support member and each said pin (289) for pretensioning said pin against said filter body.

11. Mechanism according to claim 10, characterized in that said compression spring (299) fits in a radial borehole (281) of said scraper shaft (217) so as to be insertable from outside, said pin (289) is guided so as to be narrow-fitting, but radially displaceable in a sleeve (283), and said sleeve (283) is radially displaceable in said borehole (281).

12. Mechanism according to claim 11, characterized in that said compression spring (299) is arranged within said sleeve (283) and a pressure piece (293) fastened at the radially inner end of said sleeve (283) for supporting said spring.

13. Mechanism according to claim 12, characterized in that said pressure piece (293) is sealed against said sleeve (283) and one of a fluid and plastic material is filled into said sleeve.

14. Mechanism according to claim 10, characterized in that a cam stick (279) with radially projecting cams (275, 277) is displaceable within and in the axial direction of said scraper shaft (217; 163) and said compression springs (299) can be gripped between said cams (75, 77) and said pins.

15. Mechanism according to claim 14, characterized in that said cam stick extends coaxially with said scraper shaft and said scrapers are arranged in pairs on diametrically opposite sides of said cam stick.

16. Mechanism according to claim 9, characterized in that a piston (59) is connected to each said pin (57), one of a hydraulic and pneumatic cylinder (61) arranged within said scraper shaft on the radially inner side of said pin (57) in said scraper shaft (17) and said piston is radially displaceable with said cylinder (61) for producing radially outwardly directed forces.

17. Mechanism according to claim 16, characterized in that the diameter of said piston (59) is larger than the portion of said pin (57) guided in the borehole.

18. Mechanism according to claim 16, characterized in that a common pressure source (69, 71) is connected to all of said cylinders (61).

19. Mechanism according to claim 18, characterized in that said pressure source (69,71) has an elastically pretensioned fluid reservoir.

20. Mechanism for separating materials of varying consistency, such as for separating thermoplastic plastics materials-solid material mixtures or mixtures of variously meltable plastics, comprising a housing (201, 203) forming a chamber, an axially extending hollow cylindrical filter body (207) supported in said chamber of said housing (201, 203) with a filter transmission direction extending radially of the axial direction thereof, a scraper shaft (217; 301) arranged coaxial with and rotatably mounted within said filter body (207) and supported in said housing (201, 203), said scraper shaft (217; 201) extends axially through said filter body (207) and the surface of said scraper shaft is spaced inwardly from the inside surface of said hollow filter body forming an annular space (223) and carrying at least one scraper (219, 221; 303) therebetween projecting radially outwardly from said filter body (207) into said annular space (223), a conveying device for feeding the material mixture to be separated into said annular space (223) under pressure, a first material outlet (247) connected with the outside of said filter body for receiving the filtered material and a second material outlet (255 257; 307) connected with the inside of said filter with a holding-back characteristic for the residue material retained in said filter body, according to claim 1, characterized in that said second material outlet (255, 257; 307) has at least one outlet opening and is provided in one of the circulating path and the circumferential elongation of said at least one scraper.

21. Mechanism according to claim 20, characterized in that a reversing drive reciprocally moves said scraper shaft (217; 301) with alternating rotational direction via a pregiven rotational angle smaller than 360° and in that each said outlet opening (251, 253) is adjacently arranged in the circumferential direction outside the movement paths of said scrapers (219, 221) determined by means of said rotational angle.

22. Mechanism according to claim 20 or 21, characterized in that said scraper shaft (217; 301) has several said scrapers (219, 221; 303) arranged next to one another in the axial direction of said scraper shaft and offset relative to one another by, at most, the axial width of their movement paths.

23. Mechanism according to claim 22, characterized in that one said outlet opening (251, 253) is assigned to each said scraper (219, 221) and said scrapers (219, 221) are arranged next to one another in the axial direction of said scraper shaft and said outlet openings (251,253) are offset in the circumferential direction by 180°.

24. Mechanism according to claim 22, characterized in that said scrapers (219, 221) have scraper edges extending in the axial direction of said scraper shaft and said outlet openings (251, 253) are constructed as axially extending slots in said filter body (207).

25. Mechanism according to claim 22, characterized in that said scrapers (303) are arranged closely adjacent next to one another in a row in the axial direction of said scraper shaft.

26. Mechanism according to claim 25, characterized in that two rows of said scrapers (303) are arranged next to one another in zigzag shape as seen radially and are provided at the circumference of said scraper shaft so as to offset by 180°; the corner points of said zigzag-shaped rows lie opposite one another in pairs in a mirror-inverted manner in the circumferential direction of said scraper shaft; two rows of said outlet openings (307) offset in the circumferential direction by 180° are provided, and said outlet openings (307) are provided for each row and are arranged axially spaced from one another and axially offset relative to said outlet openings (307) of the other row.

27. Mechanism according to claim 26, characterized in that at least a part of said outlet openings (307) has an approximately lozenged shaped cross-section.

28. Mechanism according to claim 22, characterized in that said scrapers (19; 173) are arranged axially next to one another in at least two rows and are aligned parallel to one another in said rows.

29. Mechanism according to claim 28, characterized in that said two rows of said scrapers (173) are provided in which said scrapers (19; 173) in said rows lie diametrically opposite one another in pairs and in that said scrapers (173) are directed in such a way that they exert axial thrust forces in the same direction on the residue material.

30. Mechanism according to claim 20, for separating a material mixture containing thermoplastic plastics, characterized by at least one cooling duct, said second material outlet (255, 257) carries away the residue material via said at least one cooling duct (255, 257), a cooling device (263) for said cooling duct, and a cross-sectional narrowing (259, 261) is provided at the outlet end of said cooling duct (255, 257).

31. Mechanism according to claim 30, characterized by a heating device (265) for heating said cross-sectional narrowing (259, 261).

32. Mechanism according to claim 30, characterized in that said cooling ducts (255, 257) of said material outlet widen conically in the outflow direction.

33. Mechanism according to claim 31, characterized in that a temperature control controls the temperature of at least one of said cooling device (263) and said heating device (265) as a function of the pressure of the material mixture in said filter body.

34. Mechanism according to claim 20 for separating a material mixture containing thermoplastic plastics, characterized in that a dosing worm (47; 191; 493) is located in said second material outlet (111) and a cooling device (49; 195; 419) cools the residue material in the area of said dosing worm (47; 191; 493).

35. Mechanism according to claim 34, characterized in that a worm casing pipe (415) for said closing worm (413) is provided in the area of its outlet end with at least one axial groove (429).

36. Mechanism according to claim 34, characterized in that said second material outlet comprises several outlet ducts (183) distributed over the circumference of said dosing worm (191) in which said dosing worm (191) extends into said outlet ducts for a part of the radial width of said ducts (183).

37. Mechanism according to claim 34, characterized in that said dosing worm (47) is arranged coaxially with respect to said scraper shaft (17) and has a worm diameter smaller than the diameter of said filter body (7) and in that said annular space (23) is connected with the circumferential surface area of said dosing worm (7) between said scraper shaft (17) and said filter body (7) via one of an annular space (51) and at least one duct and the residue material is introduced substantially radially into said dosing worm (47).

38. Mechanism according to claim 34, characterized in that a free-wheel (189; 423) drivingly connects said dosing worm (191; 413) with said scraper shaft (63).

39. Mechanism according to claim 34, characterized in that a control controls at least one of the temperature of the cooling device and the number of revolutions of said dosing worm as a function of the pressure of the material mixture in said filter body.

40. Mechanism according to claim 34, wherein the material residue contains metal, characterized in that a control (433) controls the temperature of at least one of said cooling device (419) and the number of revolutions of said dosing worm as a function of the metal portion of said residue material.

41. Mechanism according to claim 40, characterized in that said control (433) has a capacitive sensor (435) for determining the metal portion in the residue material.

42. Mechanism according to claim 1, characterized in that said scraper shaft (17; 163) is supported axially on both sides of said filter body (7; 159) at equally large shaft diameters in said housing (1, 3; 151, 155).

43. Mechanism according to claim 1, characterized in that said housing includes a frame part, said scraper shaft (17; 163; 217) passes through frame part (1; 151; 201) of said housing at which said filter body (7; 159; 207) is supported on one axial side, and a drive (31) coupled with said scraper shaft (17; 163; 217) on the other axial side.

44. Mechanism according to claim 43, characterized in by annular space, a supply duct (25; 225) of the feed device (27) transversely opens into said annular space which is formed between said scraper shaft (117; 163; 217) and a shaft passthrough opening in said frame part (1; 151; 201) adjoining the annular space (23, 161; 223) and formed between said scraper shaft (17; 163; 271) and said filter body (7; 159; 207).

45. Mechanism according to claim 29, characterized in that a collecting ring duct (41; 169; 243) is arranged between said frame part (1; 151; 201) and said filter body (7; 159; 207), axial ducts (39; 167; 239) of the first material outlet open to said ring duct (41; 169; 243) and said axial ducts (39; 167; 239) are connected with the outside of the filter body and open into said collecting ring (41; 169; 253), outlet nozzles (45; 247) connected to said collecting ring.

* * * * *